US012210753B2

(12) United States Patent
Zhao et al.

(10) Patent No.: US 12,210,753 B2
(45) Date of Patent: Jan. 28, 2025

(54) SYSTEMS AND METHODS FOR POWER AND THERMAL MANAGEMENT IN A SOLID STATE DRIVE

(71) Applicant: Innogrit Technologies Co., Ltd., Shanghai (CN)

(72) Inventors: Gang Zhao, Chandler, AZ (US); Lin Chen, Cupertino, CA (US)

(73) Assignee: Innogrit Technologies Co., Ltd., Shanghai (CN)

( * ) Notice: Subject to any disclaimer, the term of this patent is extended or adjusted under 35 U.S.C. 154(b) by 119 days.

(21) Appl. No.: 17/945,489

(22) Filed: Sep. 15, 2022

(65) Prior Publication Data
US 2024/0094926 A1    Mar. 21, 2024

(51) Int. Cl.
*G06F 12/00* (2006.01)
*G06F 3/06* (2006.01)

(52) U.S. Cl.
CPC .......... *G06F 3/0625* (2013.01); *G06F 3/0653* (2013.01); *G06F 3/0679* (2013.01)

(58) Field of Classification Search
CPC ..... G06F 3/0625; G06F 3/0653; G06F 3/0679
See application file for complete search history.

(56) References Cited

U.S. PATENT DOCUMENTS

| | | | | |
|---|---|---|---|---|
| 2019/0227920 A1* | 7/2019 | Gerhart | .................. | G06F 3/0679 |
| 2020/0042870 A1* | 2/2020 | Zhao, Jr. | .................. | G06F 17/11 |
| 2020/0394506 A1* | 12/2020 | Louizos | .................... | G06N 3/08 |
| 2021/0255799 A1* | 8/2021 | Kale | ....................... | G06N 3/049 |
| 2021/0263828 A1* | 8/2021 | Gross | ...................... | G06N 20/00 |
| 2022/0164660 A1* | 5/2022 | Fietzek | ..................... | G06N 3/08 |
| 2023/0229352 A1* | 7/2023 | Soberanes | ............. | G06F 3/0679 |
| | | | | 711/154 |
| 2023/0259757 A1* | 8/2023 | Margolin | ........... | G06Q 30/0601 |
| | | | | 706/21 |
| 2023/0418505 A1* | 12/2023 | Dar | ........................ | G06F 3/0679 |
| 2024/0004443 A1* | 1/2024 | Zhang | ..................... | G06N 20/00 |

OTHER PUBLICATIONS

Chandranil Chakraborttii "Improving Performance of Solid-State Drives Using Machine Learning" UC Santa Cruz Electronic Theses and Dissertations, Jun. 2021.

* cited by examiner

*Primary Examiner* — David Yi
*Assistant Examiner* — Tahilba O Puche
(74) *Attorney, Agent, or Firm* — IPro, PLLC

(57) ABSTRACT

Systems, apparatus and methods are provided for determining an optimal performance profile and a predicted temperature. A method may include receiving a command from a host. The command may contain a logical block address (LBA) for data stored in a data storage system, a length for a data size associated with the command, and a timestamp associated with the command. The method may further include obtaining LBA information, the timestamp, the data size from the command, providing the LBA information, the timestamp, the data size, along with temperature readings, and a performance profile as inputs to a machine learning model, determining an optimal performance profile and a predicted temperature using the machine learning model and configuring a storage controller with settings of the optimal performance profile.

13 Claims, 3 Drawing Sheets

SYSTEMS AND METHODS FOR POWER AND THERMAL MANAGEMENT IN A SOLID STATE DRIVE

TECHNICAL FIELD

The disclosure herein relates to data storage, particularly relates to power management and thermal management for solid state drives.

BACKGROUND

The evolution of the modern computing system is driven in-part by the emergence of the solid state drives (SSDs) that have demonstrated higher performance of speed and latency over the traditional hard drives. Unlike hard drives that depend on the magnetism to store data, solid state drives use NAND flash devices to achieve data storage. The NAND flash devices are a family of integrated circuits that are manufactured by advanced process and assembly technologies to achieve multiple levels of 3D vertical stacking of storages units into a small footprint of die and package for high capacity of storage.

As the modern SSDs are developed towards higher speed and higher Read/Write performance of over 5-GB/s, there has been an increasing demand for more advanced power and thermal management technology to ensure acceptable thermal performance and optimal battery life for SSDs. For applications involving high power consumption, the performance profiles of an SSD often need to be tuned down to prevent overheating and thermal throttling. For applications with minimal system throughput requirement, the performance profiles can also be adjusted to achieve optimal power consumption.

Existing power and thermal management schemes include a limited number of thermal calibrations with various performance profiles. Temperature is measured for each individual performance profile, and one profile will be selected which will meet the performance requirement without violating the maximum temperature requirement.

Because the performance profile is selected and fixed before the SSD is shipped to customers, further dynamic change or adaptive adjustment of the performance profiles is usually prohibited. The SSD drive can often run into overheating and excessive power problems when the thermal environment is different, or the user applications are different than those during the thermal calibration. Therefore, an improved power and thermal management technique is needed to adaptively adjust the performance profiles to the thermal environment and user applications.

SUMMARY

The disclosed subject matter relates to systems, methods, and devices that may determine an optimal performance profile and a predicted temperature. In an exemplary embodiment, there is provided an apparatus that may comprise a first interface to be coupled to a host and circuitry configured to: receive a command via the first interface from the host, the command containing a logical block address (LBA) for data stored in a data storage system, a length for a data size associated with the command, and a timestamp associated with the command; obtain LBA information, the timestamp, the data size from the command; provide the LBA information, the timestamp, the data size, along with temperature readings, and a performance profile as inputs to a machine learning model; determine an optimal performance profile and a predicted temperature using the machine learning model; and configure a storage controller with settings of the optimal performance profile.

In another exemplary embodiment, there is provided a method comprising: receiving a command from a host, the command containing a logical block address (LBA) for data stored in a data storage system, a length for a data size associated with the command, and a timestamp associated with the command; obtaining LBA information, the timestamp, the data size from the command; providing the LBA information, the timestamp, the data size, along with temperature readings, and a performance profile as input features to a machine learning model; determining an optimal performance profile and a predicted temperature using the machine learning model; and configuring a storage controller with settings of the optimal performance profile.

In yet another embodiment, there may be provided one or more non-transitory computer-readable media encoded with computer executable instructions that, when executed, cause at least one processor to perform actions comprising: receiving a command from a host, the command containing a logical block address (LBA) for data stored in a data storage system, a length for a data size associated with the command, and a timestamp associated with the command; obtaining LBA information, the timestamp, the data size from the command; providing the LBA information, the timestamp, the data size, along with temperature readings, and a performance profile as input features to a machine learning model; determining an optimal performance profile and a predicted temperature using the machine learning model; and configuring a storage controller with settings of the optimal performance profile.

DETAILED DESCRIPTION

Figure 1:
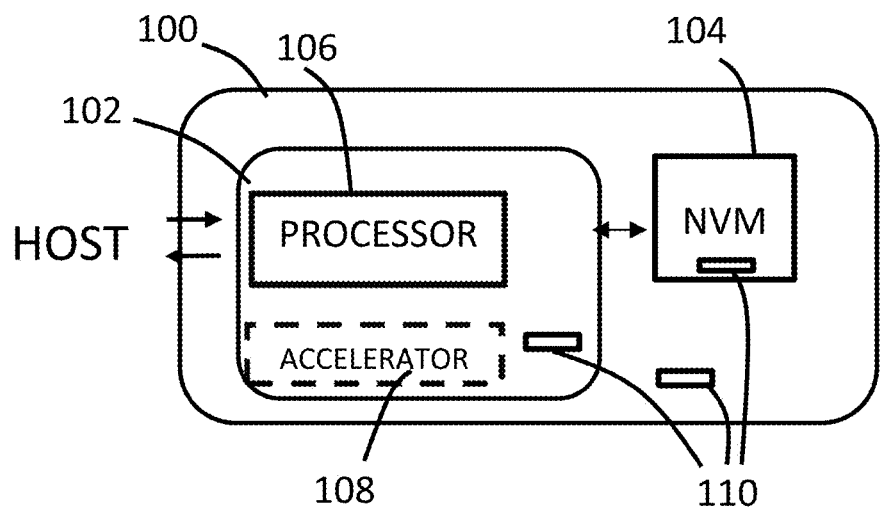
FIG. 1 schematically shows a storage system in accordance with an embodiment of the present disclosure.

Specific embodiments according to the present disclosure will now be described in detail with reference to the accompanying figures. Like elements in the various figures are denoted by like reference numerals for consistency.

FIG. 1 schematically shows an exemplary non-volatile storage system 100 in accordance with an embodiment of the present disclosure. The storage system 100 may comprise a storage controller 102 and a non-volatile storage device 104. The storage system 100 may provide data storage and/or access to stored data to a host when it is coupled to the host. The one non-volatile storage device 104 may be a non-volatile memory (NVM) device, for example, a NAND device. It should be noted that the storage system 100 may comprise a plurality of non-volatile storage devices and the non-volatile storage device 104 may be shown as a representative for the plurality of non-volatile storage devices. In various embodiments, the storage system 100 may be a USB, a SSD or any other suitable storage system comprising NVMs.

The storage controller 102 may comprise a processor 106, and an optional accelerator 108. The processor 106 may be a computer processor, such as, but not limited to, a microprocessor or a microcontroller. The accelerator 108 may be implemented by a microprocessor, a microcontroller, a FPGA, an ASIC or a GPU. The storage system 100 may include one or more temperature sensors 110. The temperature sensors 110 may be positioned on the storage controller 102, the NVM 104 and/or somewhere else of the storage system 100 (e.g., package of the SSD or a printed circuit board of the SSD). The temperature sensors 110 may provide temperature readings indicate temperatures at different positions of the storage system 100.

The host may perform a variety of data processing tasks with the storage system 100 through the host interface. In an embodiment, the host may use a logical block address (LBA) to specify the location of a data block stored in the NVM 104. LBA may be a linear addressing scheme where blocks may be identified by an integer index, for example, the first block being LBA 000, the second LBA 001, and so on. When the host wants to read data from or write data to the storage system 100, the host may issue a Read or Write command with an LBA and the data size information (e.g., number of blocks) to the storage system 100. In some embodiments, mapping from LBA to physical address may be performed by the storage controller 102.

Data may be stored in the non-volatile storage device 104 on physical pages of physical blocks. The logical blocks used by the host are mapped or translated to physical addresses by the storage controller 102. It should be noted that data received from the host may be encoded (e.g., ECC encoded) into codewords at the storage controller 102 and the codewords are saved to the non-volatile storage device 104. Therefore, in some embodiments, the storage controller 102 may comprise one or more ECC encoders and one or more ECC decoders.

In some embodiment, a set of performance profiles may be constructed based on common system performance benchmarks. For non-volatile storage systems (e.g., SSDs), common system performance benchmarks may include sequential read and sequential write. For example, the performance profiles may be created for sequential read performance at 1 GB/s, 2 GB/s, . . . , to 8 GB/s, with an interval of 1 GB/s. Thus, a total of 8 performance profiles may be created with different settings of clock frequencies, driver strength and termination settings.

The storage system 100 may be configured to determine an optimal performance profile for maximal efficiency and optimal power consumption. For example, under high-power high-performance applications, the temperature readings may be high at the storage system 100, the controller 102 and the NVM 104. The storage system 100 may have a relatively high probability of entering thermal throttling, which results in drastic performance reduction and is very undesirable to the user. Therefore, an optimal performance profile may need to be selected to ensure sufficient performance while preventing the storage system 100 from entering thermal throttling. On the other hand, during applications with very low data access to the storage system 100, the storage system 100 may pick a low performance profile for power-saving purpose.

Figure 2:
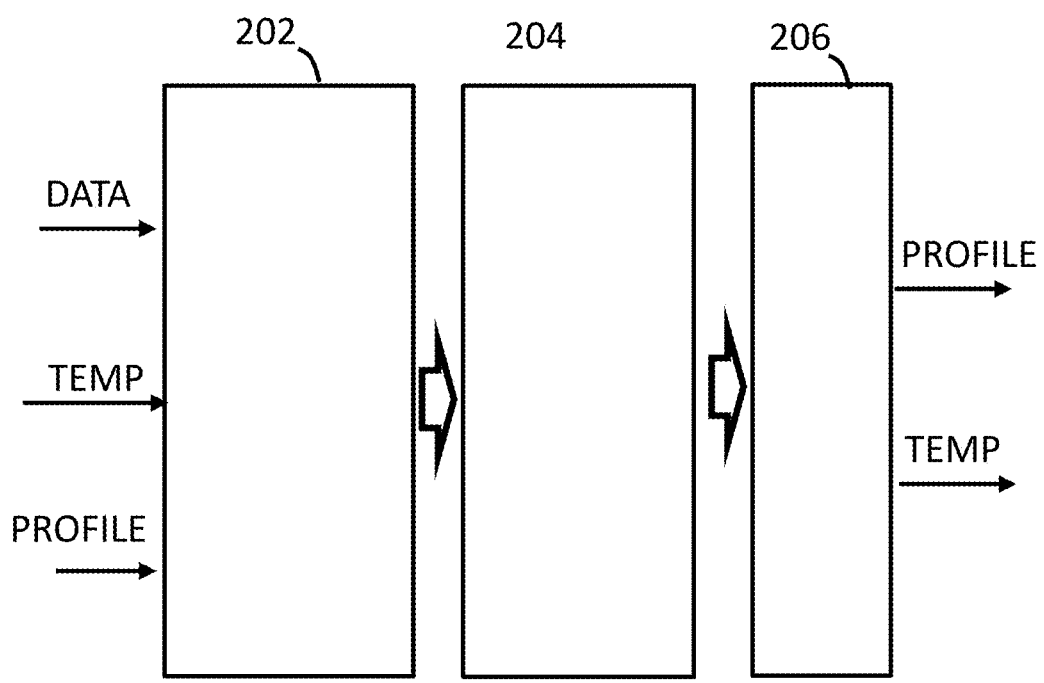
FIG. 2 schematically shows a neural network-based machine learning model in accordance with an embodiment of the present disclosure.

FIG. 2 schematically shows a neural network-based machine learning model 200 in accordance with an embodiment of the present disclosure. The machine learning model 200 may comprise a collection of connected units or nodes called artificial neurons, which loosely model neurons in biological brain. Output of each neuron may be computed by an activation function, which may be a non-linear function of the sum of its inputs. Nonlimiting examples of the activation functions may include, Sigmoid, Tan h, Rectified Linear Unit (ReLU), and Leaky-ReLU.

The neurons of the neural network may be grouped into three layers: an input layer 202, a set of hidden layers 204 and an output layer 206. The input layer 202 may comprise neurons configured to receive input signals, which may be referred to as input features. There may be three sets of input features: data information, temperature information and performance profile. In an embodiment, the data information used as inputs to the machine learning model 200 may include a stream of data information associated with data access commands. Each command may have a logical block address (LBA), a data size (number of blocks of data to be accessed) and a timestamp associated with the command. The input features of the temperature information may be the temperature readouts from the various temperature sensors 110 at the storage controller 102, the NVM 104 and/or a printed circuit board of the storage system 100. The input feature of performance profile may be an integer from 1 to 8.

The hidden layers 204 may comprise one or more layers of neurons between the input layer 202 and the output layer 206. In an embodiment, the neural network-based machine learning model 200 may be a convolutional neural network (CNN), which may include one or more convolutional layers, one or more pooling layers and one or more fully-connected layers in the hidden layers 204.

The output layer 206 may comprise neurons to output one or more signals based on input features. The output features of the machine learning model 200 may include a predicted temperature and a predicted performance profile (from 1 to 8). For this multi-output machine-learning model, a loss function may be assigned for each output feature, and thus, there may be two 2 loss functions in one embodiment. Alternatively, in another embodiment, one single loss function F0 may be assigned as a sum of 2 loss functions, for example, F0=F1+F2, or a weighted sum such as F0=w1*F1+w2*F2 with w1 and w2 as two respective weights for F1 and F2. The training of the machine learning model involves the minimization of the loss function(s). In one embodiment, each of the loss function F1 and F2 may be a mean squared error $$MSE = MSE = \frac{1}{n}\sum\nolimits_{i=1}^{n}(Y_i - \hat{Y}_i)^2.$$

In some embodiments, the loss function may also include the difference between the predicted temperature and a predetermined temperature threshold. Once the predicted temperature is greater than the temperature threshold, the difference between the predicted temperature and the temperature threshold may be heavily weighted into the loss function calculation (e.g., with a very high cost), to ensure the machine learning model be trained to avoid overheating and thermal throttling scenarios. In one embodiment, the predefined temperature threshold may be set to 85° C. if the temperature reading is from a temperature sensor 110 on the SSD or the NVM. In another embodiment, the predefined temperature threshold may be set to 105° C. if the temperature reading is from a temperature sensor 110 on the non-volatile storage controller 102.

Figure 3:
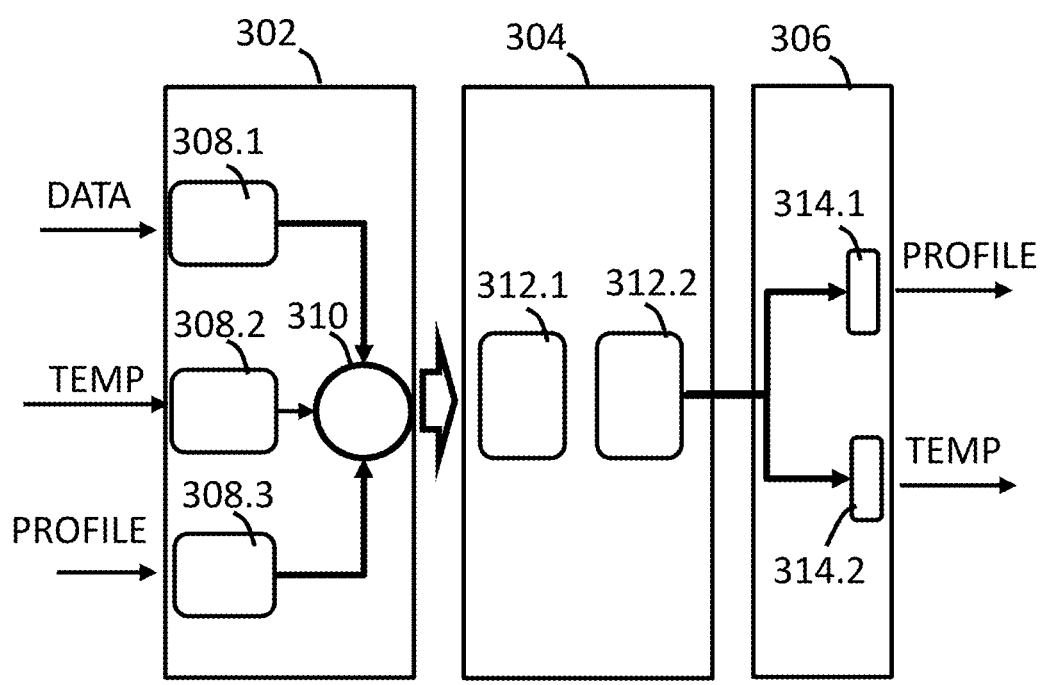
FIG. 3 schematically shows a neural network-based machine learning model in accordance with another embodiment of the present disclosure.

FIG. 3 schematically shows a neural network-based machine learning model 300 in accordance with another embodiment of the present disclosure. The machine learning model 300 may be another embodiment of the machine learning model 200 and also comprise three layers: an input layer 302, a set of hidden layers 304 and an output layer 306. The input layer 302 may comprise an embedding layer 308.1 to receive the input feature of data information, an embedding layer 308.2 to receive the input feature of temperature information and an embedding layer 308.3 to receive the input feature of performance profile.

The data information used as inputs to the machine learning model 300 may also include a stream of data information associated with data access commands. Although each command may have a logical block address (LBA), a data size (number of blocks of data to be accessed) and a timestamp associated with the command, the input feature may include a LBA delta, and the data size and the timestamp. The LBA delta may be the LBA difference between the current command and a preceding command. For example, if one command has a LBA 1050 and the previous command has a LBA 1000, the LBA delta may be 50 (e.g., 1050-1000). The input features of the temperature information may be the temperature readouts from the various temperature sensors 110 at the storage controller 102, the NVM 104 and/or a printed circuit board of the storage system 100. The input feature of performance profile may be an integer from 1 to 8.

Embedding may be used to generate lower-dimensional space representation from high dimension vectors. For example, the LBA delta of the input data feature may have a wide range. Each LBA delta may be represented by a sparse vector and the embedding layer 308.1 may translate the sparse input to a dense distributed representation. Moreover, temperature readings and performance profile input features may also be represented in sparse vectors and translated by embedding layers 308.2 and 308.3, respectively, into dense representations. In one embodiment, the inputs to the model 300 may categorical, one-hot, representation of the three features: LBA deltas, temperature and performance profile.

The hidden layers 304 may include two hidden Long Short-Term Memory (LSTM) layers 312.1 and 312.2. The outputs of the embedding layers may be concatenated at the concatenation layer 310 and then fed to the shared LSTM layers 312.1 and 312.2. The final output layer 306 may be split into two branches, and each branch may include a dense layer (e.g., 314.1 and 314.2) consisting of softmax nodes. In some embodiments, the hidden layers 304 may be implemented by a Temporal Convolutional Network (TCN), which may be a variant of CNN and may employ causal convolutions and dilations to learn from sequential data with temporality.

The machine learning models 200 and 300 may be trained and optimized using a conventional or any suitable training and optimization process for a neural network. In an embodiment, the training and optimization process may comprise applying input data and propagating computed data to output, computing the loss between a labeled value and a predicted value using the loss function, performing a backpropagation of error and optimizing parameters of the neural network with a gradient algorithm. This process may be iterated until the loss is smaller than a pre-defined loss threshold or the training epoch exceeds a pre-defined epoch threshold. In some embodiments, there may be a validation dataset for profiling the training results in a validation process, a test dataset for testing the neural network in a testing process, or both.

In some embodiments, after an initial training process, the machine learning models 200 and 300 may be further trained with an online learning process to adjust its parameters. For example, after the storage system 100 has been put into use, the storage controller 102 may be configured to continuously or intermittently to adjust the parameters of the neural network with work data.

In an embodiment, the machine learning models 200 and/or 300 may be implemented by the processor 106. For example, the machine learning models 200 and/or 300 may be programmed in software and the processor 106 may execute software program instructions to. In another embodiment, the machine learning models 200 and/or 300 may be implemented in hardware, for example, by ASIC, FPGA, GPU or a combination of them. For example, in some embodiments, the accelerator 108 may be configured to implement the machine learning models 200 and/or 300. In yet another embodiment, the machine learning models 200 and/or 300 may be implemented by a combination of software and hardware.

Figure 4:
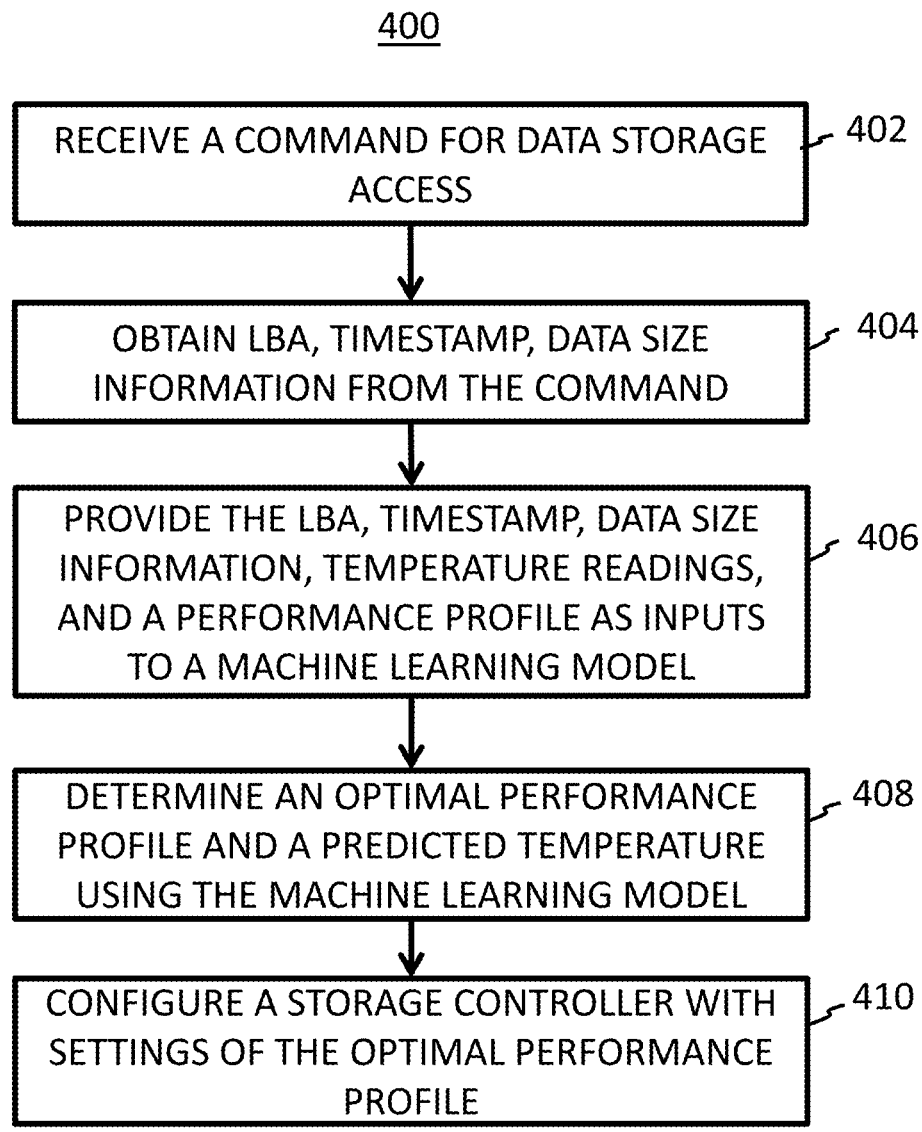
FIG. 4 is a flowchart of a process for determining an optimal performance profile and a predicted temperature in accordance with an embodiment of the present disclosure.

FIG. 4 is a flowchart of a process 400 for determining a predicted temperature and a performance profile in accordance with an embodiment of the present disclosure.

At block 402, a command may be received in a data storage system. For example, a memory access command for reading or writing (e.g., a read or write command) may be received by the storage controller 102 from a host via the first interface 110. The command may contain an address (e.g., LBA) for data storage in the data storage system and a length for a data size associated with the command, and have an associated timestamp. At block 404, the LBA, timestamp, data size information may be obtained from the command.

At block 406, the LBA, timestamp, data size information, along with temperature readings, and a performance profile may be provided as inputs to a machine learning model. For example, the information of LBA, data size and timestamp may be extracted from the received command. And this extracted information, together with the temperature readings and the performance profile, may be provided to the machine learning model 200 or 300 for processing.

At block 408, an optimal performance profile and a predicted temperature may be determined using the machine learning model. For example, the machine learning model 200 or 300 may output an optimal performance profile and a predicted temperature.

At block 410, a storage controller may be configured with settings of the optimal performance profile. For example, the non-volatile controller 102 may be configured by the optimal performance profile setting determined from the machine learning model 200 or 300, in order to adapt to the environment temperature and real-time user applications.

It should be appreciated that in some embodiments, the storage controller 102 may include fewer or more modules apart from those shown in FIG. 1. Moreover, the techniques described herein may be implemented in hardware, in software, or a combination of hardware and software. The choice of implementing any portion of the above techniques in hardware or software may depend on the requirements of an implementation. For example, the process 400 may be in the form of firmware that is processed by Application Specific Integrated Circuits (ASICs), which may be integrated into a circuit board. Alternatively, the process 400 may be in the form of one or more logic blocks included in a programmable logic device (e.g., a field-programmable gate array). Moreover, the process 400 or at least portion of the process 400 may be implemented by computer software instructions and encoded in volatile memory, non-volatile memory, RAM, flash memory, ROM, EPROM, or any other form of a non-transitory computer-readable storage medium.

In an exemplary embodiment, there is provided an apparatus that may comprise a first interface to be coupled to a host and circuitry configured to: receive a command via the first interface from the host, the command containing a logical block address (LBA) for data stored in a data storage system, a length for a data size associated with the command, and a timestamp associated with the command; obtain LBA information, the timestamp, the data size from the command; provide the LBA information, the timestamp, the data size, along with temperature readings, and a performance profile as inputs to a machine learning model; determine an optimal performance profile and a predicted temperature using the machine learning model; and configure a storage controller with settings of the optimal performance profile.

In an embodiment, the temperature readings may include readings from one or more temperature sensors positioned on the storage controller, the data storage system and/or a non-volatile memory device of the data storage system.

In an embodiment, the machine learning model may have an output layer that implements a loss function for the predicted temperature, and the loss function includes a difference between the predicted temperature and a predetermined temperature threshold and ensures the machine learning model be trained to avoid overheating and thermal throttling scenarios, and the predetermined temperature threshold has a value based on a position of the temperature sensor.

In an embodiment, the circuitry may comprise an accelerator for the machine learning model.

In an embodiment, the LBA information may include a LBA delta that is a difference between the LBA of the command and a previous LBA of a previous command.

In an embodiment, the machine learning model may have an input layer that has embedding layers for data information, the temperature readings and the performance profile, respectively, and the data information includes the LBA delta, the data size and the timestamp.

In an embodiment, outputs from the embedding layers may be concatenated by a concatenation layer and fed to a set of hidden layers, and outputs from the hidden layers may be split into two branches each containing a set of softmax nodes for the optimal performance profile and the predicted temperature, respectively.

In another exemplary embodiment, there is provided a method comprising: receiving a command from a host, the command containing a logical block address (LBA) for data stored in a data storage system, a length for a data size associated with the command, and a timestamp associated with the command; obtaining LBA information, the timestamp, the data size from the command; providing the LBA information, the timestamp, the data size, along with temperature readings, and a performance profile as input features to a machine learning model; determining an optimal performance profile and a predicted temperature using the machine learning model; and configuring a storage controller with settings of the optimal performance profile.

In an embodiment, the temperature readings may include readings from one or more temperature sensors positioned on the storage controller, the data storage system and/or a non-volatile memory device of the data storage system.

In an embodiment, the machine learning model may have an output layer that implements a loss function for the predicted temperature, and the loss function includes a difference between the predicted temperature and a predetermined temperature threshold and ensures the machine learning model be trained to avoid overheating and thermal throttling scenarios, and the predetermined temperature threshold has a value based on a position of the temperature sensor.

In an embodiment, the LBA information may include a LBA delta that is a difference between the LBA and a previous LBA of a previous command.

In an embodiment, the machine learning model may have an input layer that has embedding layers for data information, the temperature readings and the performance profile, respectively, and the data information may include the LBA delta, the data size and the timestamp.

In an embodiment, outputs from the embedding layers may be concatenated by a concatenation layer and fed to a set of hidden layers.

In an embodiment, outputs from the hidden layers may be split into two branches each containing a set of softmax nodes for the optimal performance profile and the predicted temperature, respectively.

In yet another embodiment, there may be provided one or more non-transitory computer-readable media encoded with computer executable instructions that, when executed, cause at least one processor to perform actions comprising: receiving a command from a host, the command containing a logical block address (LBA) for data stored in a data storage system, a length for a data size associated with the command, and a timestamp associated with the command; obtaining LBA information, the timestamp, the data size from the command; providing the LBA information, the timestamp, the data size, along with temperature readings, and a performance profile as input features to a machine learning model; determining an optimal performance profile and a predicted temperature using the machine learning model; and configuring a storage controller with settings of the optimal performance profile.

In an embodiment, the temperature readings may include readings from one or more temperature sensors positioned on the storage controller, the data storage system and/or a non-volatile memory device of the data storage system.

In an embodiment, the machine learning model may have an output layer that implements a loss function for the predicted temperature, and the loss function includes a difference between the predicted temperature and a predetermined temperature threshold and ensures the machine learning model be trained to avoid overheating and thermal throttling scenarios, and the predetermined temperature threshold has a value based on a position of the temperature sensor.

In an embodiment, the LBA information may include a LBA delta that is a difference between the LBA and a previous LBA of a previous command.

In an embodiment, the machine learning model may have an input layer that has embedding layers for data information, the temperature readings and the performance profile, respectively, and the data information may include the LBA delta, the data size and the timestamp.

In an embodiment, outputs from the embedding layers may be concatenated by a concatenation layer and fed to a set of hidden layers, and outputs from the hidden layers may be split into two branches each containing a set of softmax nodes for the optimal performance profile and the predicted temperature, respectively.

Any of the disclosed methods and operations may be implemented as computer-executable instructions (e.g., software code for the operations described herein) stored on one or more computer-readable storage media (e.g., non-transitory computer-readable media, such as one or more optical media discs, volatile memory components (such as DRAM or SRAM), or nonvolatile memory components (such as hard drives)) and executed on a device controller (e.g., firmware executed by ASIC). Any of the computer-executable instructions for implementing the disclosed techniques as well as any data created and used during implementation of the disclosed embodiments can be stored on one or more computer-readable media (e.g., non-transitory computer-readable media).

As used herein, a non-volatile memory device may be a computer storage device that can maintain stored information after being powered off, and the stored information may be retrieved after being power cycled (turned off and back on). Non-volatile storage devices may include floppy disks, hard drives, magnetic tapes, optical discs, NAND flash memories, NOR flash memories, Magnetoresistive Random Access Memory (MRAM), Resistive Random Access Memory (RRAM), Phase Change Random Access Memory (PCRAM), Nano-RAM, etc. In the description, a NAND flash may be used an example for the proposed techniques. However, various embodiments according to the present disclosure may implement the techniques with other kinds of non-volatile storage devices.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. An apparatus, comprising:
a first interface configured to couple to a host; and
circuitry configured to:
receive a command via the first interface from the host, the command containing a logical block address (LBA) for data stored in a data storage system, a data size, and a timestamp;
obtain LBA information, the timestamp, the data size from the command;
provide the LBA information, the timestamp, the data size, along with temperature readings, and a performance profile as inputs to a machine learning model;
determine an optimal performance profile and a predicted temperature using the machine learning model; and
configure a storage controller with settings of the optimal performance profile;
wherein the LBA information includes a LBA delta that is a difference between the LBA of the command and a previous LBA of a previous command;
wherein the machine learning model has an input layer that has embedding layers for data information, the temperature readings and the performance profile, respectively, and the data information includes the LBA delta, the data size and the timestamp;
wherein outputs from the embedding layers are concatenated by a concatenation layer and fed to a set of hidden layers, and outputs from the hidden layers are split into two branches each containing a set of softmax nodes for the optimal performance profile and the predicted temperature, respectively.

2. The apparatus of claim 1, wherein the temperature readings include readings from one or more temperature sensors positioned on the storage controller, the data storage system and/or a non-volatile memory device of the data storage system.

3. The apparatus of claim 2, wherein the machine learning model has an output layer that implements a loss function for the predicted temperature, and wherein the loss function includes a difference between the predicted temperature and a predetermined temperature threshold and ensures the machine learning model be trained to avoid overheating and thermal throttling scenarios, and the predetermined temperature threshold has a value based on a position of the one or more temperature sensors.

4. The apparatus of claim 1, wherein the circuitry comprises an accelerator for the machine learning model.

5. A method, comprising:
receiving a command from a host, the command containing a logical block address (LBA) for data stored in a data storage system, a data size, and a timestamp;
obtaining LBA information, the timestamp, the data size from the command;
providing the LBA information, the timestamp, the data size, along with temperature readings, and a performance profile as input features to a machine learning model;
determining an optimal performance profile and a predicted temperature using the machine learning model; and
configuring a storage controller with settings of the optimal performance profile;
wherein the LBA information includes a LBA delta that is a difference between the LBA and a previous LBA of a previous command;
wherein the machine learning model has an input layer that has embedding layers for data information, the temperature readings and the performance profile, respectively, and the data information includes the LBA delta, the data size and the timestamp;
wherein outputs from the embedding layers are concatenated by a concatenation layer and fed to a set of hidden layers;
wherein outputs from the hidden layers are split into two branches each containing a set of softmax nodes for the optimal performance profile and the predicted temperature, respectively.

6. The method of claim 5, wherein the temperature readings include readings from one or more temperature sensors positioned on the storage controller, the data storage system and/or a non-volatile memory device of the data storage system.

7. The method of claim 6, wherein the machine learning model has an output layer that implements a loss function for the predicted temperature, and wherein the loss function includes a difference between the predicted temperature and a predetermined temperature threshold and ensures the machine learning model be trained to avoid overheating and thermal throttling scenarios, and the predetermined temperature threshold has a value based on a position of the one or more temperature sensors.

8. One or more non-transitory computer readable storage media encoded with computer executable instructions that, when executed, cause at least one processor to perform actions comprising:
receiving a command from a host, the command containing a logical block address (LBA) for data stored in a data storage system, a data size, and a timestamp;

obtaining LBA information, the timestamp, the data size from the command;

providing the LBA information, the timestamp, the data size, along with temperature readings, and a performance profile as input features to a machine learning model;

determining an optimal performance profile and a predicted temperature using the machine learning model; and configuring a storage controller with settings of the optimal performance profile;

wherein the LBA information includes a LBA delta that is a difference between the LBA and a previous LBA of a previous command;

wherein the machine learning model has an input layer that has embedding layers for data information, the temperature readings and the performance profile, respectively, and the data information includes the LBA delta, the data size and the timestamp;

wherein outputs from the embedding layers are concatenated by a concatenation layer and fed to a set of hidden layers, and outputs from the hidden layers are split into two branches each containing a set of softmax nodes for the optimal performance profile and the predicted temperature, respectively.

9. The non-transitory computer readable storage media of claim 8, wherein the temperature readings include readings from one or more temperature sensors positioned on the storage controller, the data storage system and/or a non-volatile memory device of the data storage system.

10. The non-transitory computer readable storage media of claim 9, wherein the machine learning model has an output layer that implements a loss function for the predicted temperature, and wherein the loss function includes a difference between the predicted temperature and a predetermined temperature threshold and ensures the machine learning model be trained to avoid overheating and thermal throttling scenarios, and the predetermined temperature threshold has a value based on a position of the one or more temperature sensors.

11. The apparatus of claim 1, wherein the circuitry is configured to determine the optimal performance profile and the predicted temperature using the machine learning model based on the LBA information, the timestamp, the data size, the temperature readings, and the performance profile.

12. The method of claim 5, wherein determining the optimal performance profile and the predicted temperature using the machine learning model is based on the LBA information, the timestamp, the data size, the temperature readings, and the performance profile.

13. The non-transitory computer readable storage media of claim 8, wherein determining the optimal performance profile and the predicted temperature using the machine learning model is based on the LBA information, the timestamp, the data size, the temperature readings, and the performance profile.

* * * * *